United States Patent
Germain et al.

(10) Patent No.: US 8,434,447 B2
(45) Date of Patent: May 7, 2013

(54) DOUBLE-PLENUM INLET MANIFOLD AND VEHICLE INCORPORATING SUCH A MANIFOLD

(75) Inventors: Laurent Germain, Jeuxey (FR); Denis Menin, Labaroche (FR)

(73) Assignee: Systemes Moteurs (SAS), Levallois-Perret (FR)

( * ) Notice: Subject to any disclaimer, the term of this patent is extended or adjusted under 35 U.S.C. 154(b) by 588 days.

(21) Appl. No.: 12/171,541

(22) Filed: Jul. 11, 2008

(65) Prior Publication Data

US 2009/0071430 A1  Mar. 19, 2009

(30) Foreign Application Priority Data

Jul. 13, 2007 (FR) ...................................... 07 05112

(51) Int. Cl.
 *F02M 35/10* (2006.01)
(52) U.S. Cl.
 USPC ............. 123/184.43; 123/184.48; 123/568.17
(58) Field of Classification Search ............. 123/184.47, 123/184.53, 184.42, 184.45, 184.21, 184.55, 123/184.34, 184.36, 184.22, 184.43, 184.48, 123/568.17
 See application file for complete search history.

(56) References Cited

U.S. PATENT DOCUMENTS

| | | | | |
|---|---|---|---|---|
| 3,783,842 A | * | 1/1974 | Kuhn et al. | .................... 123/470 |
| 4,970,994 A | | 11/1990 | Sawada et al. | |
| 5,138,983 A | * | 8/1992 | Daly | ........................ 123/184.31 |
| 5,713,323 A | * | 2/1998 | Walsh et al. | ............. 123/184.42 |
| 2002/0195076 A1 | | 12/2002 | Nomizo et al. | |
| 2006/0207578 A1 | | 9/2006 | Gallino et al. | |
| 2007/0028883 A1 | | 2/2007 | Kotouge | |

FOREIGN PATENT DOCUMENTS

| | | |
|---|---|---|
| AT | 413862 | 6/2006 |
| FR | 2879249 | 6/2006 |
| JP | 9-100755 | 4/1997 |

OTHER PUBLICATIONS

English language Abstract of AT 413862, Jun. 15, 2006.
English language Abstract of JP 9-100755, Apr. 15, 1997.
English language Abstract of FR 2879249, Jun. 16, 2006.

* cited by examiner

*Primary Examiner* — Noah Kamen
(74) *Attorney, Agent, or Firm* — Greenblum & Bernstein P.L.C.

(57) ABSTRACT

This invention relates to a double-plenum or double-chamber inlet manifold or splitter, made up of a structural unit comprising two distinct coupled plenums with a common wall, an inlet opening for each of the two plenums and several pipes through each of the said plenums, the said superimposed plenums having substantially flattened general structures and forming, with their respectively connected inlet openings and pipes, two independent circulation circuits running from the entrance at the inlet openings to the outlet at the external openings of the pipes, the said external or outlet openings of the pipes being grouped in pairs, with each pair having an opening of each of the two types of pipes; the manifold comprises two one-piece parts assembled together, in a gas-tight manner, at the continuous assembly areas, a first part incorporating at least the two inlet openings and first portions of the walls of the two plenums, contiguous to the said openings and the second part incorporating the pipes and second portions of the walls of the two plenums, contiguous to the said pipes and complementary to the above-mentioned first portions.

13 Claims, 6 Drawing Sheets

US 8,434,447 B2

DOUBLE-PLENUM INLET MANIFOLD AND VEHICLE INCORPORATING SUCH A MANIFOLD

This invention relates to the field of equipment for vehicles with an internal combustion engine and more particularly to the air inlet systems of such vehicles.

The invention concerns more specifically a double-plenum inlet manifold and a vehicle that incorporates such a manifold.

BACKGROUND OF THE INVENTION

Double-plenum or double-chamber manifolds or splitters are used chiefly in air inlet systems in which the EGR gases are recycled. They enable the engine cylinders to be supplied by two flows of gas, one based on fresh air and the other made up of the EGR gases.

These two flows of gas can be kept separate until their injection into the cylinder head. It is therefore necessary to provide two circulation circuits for the manifold that are independent of each other, from the inlet opening to the pipe outlets.

This results in a complex structure, particularly in the case of a flattened formation of the manifold designed to reduce the amount of space occupied.

Currently, this type of manifold is at best formed by assembling at least three separate component parts.

SUMMARY OF THE INVENTION

The object of the invention consists in proposing a double-plenum manifold of the above-described type which is formed by assembling only two parts, enabling its production cost to be considerably reduced (two moulds instead of three and just one assembly cycle as opposed to two) and increasing performance in terms of mechanical strength, seal and reliability of construction of the manifold obtained, particularly by simplifying and reducing the interface areas.

BRIEF DESCRIPTION OF THE DRAWINGS

Further features and advantages of the invention will emerge from the following description of two variations of a preferred embodiment, given by way of non-limiting example and explained with reference to the accompanying drawings, in which.

DETAILED DESCRIPTION OF THE INVENTION

Figure 1:
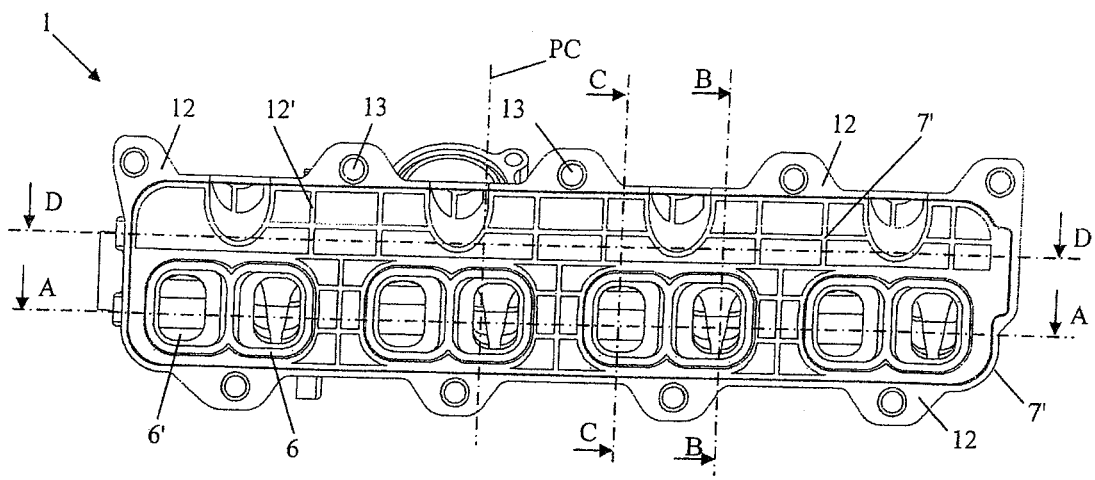
FIG. 1 is a side elevation, pipe-outlet side, of a manifold according to the invention.
Figure 2A:
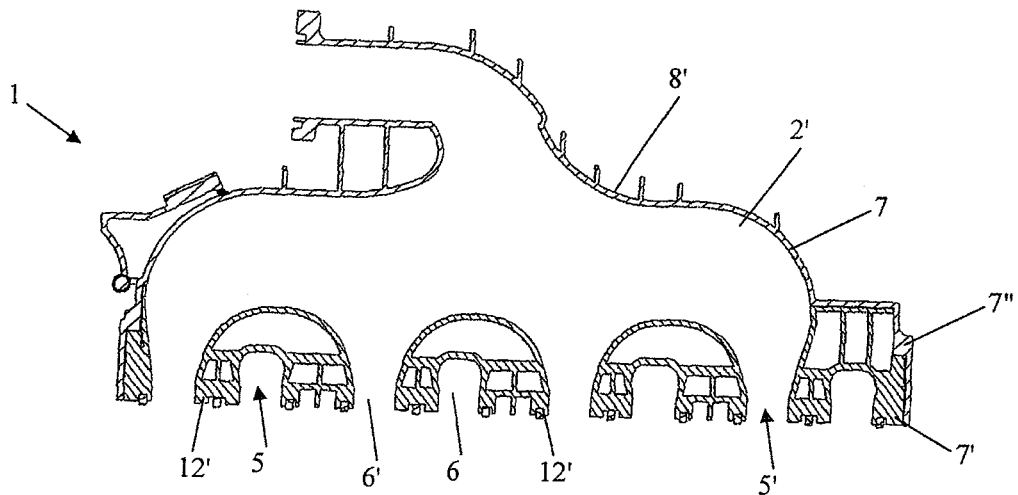
FIGS. 2A, 2B, 2C and 2D are cross-sections along A-A, B-B, C-C and D-D respectively of the object of FIG. 1.
Figure 2B:
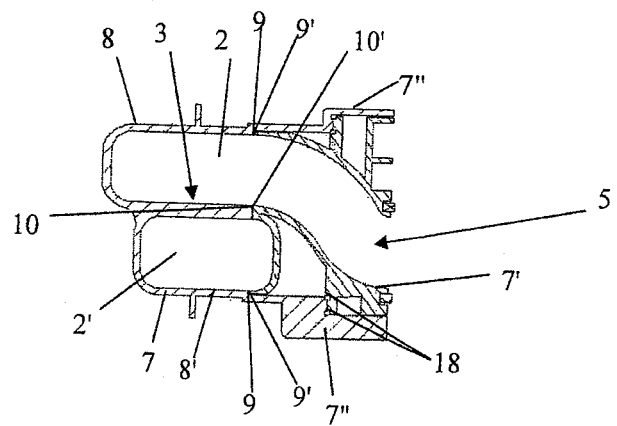
Figure 2C:
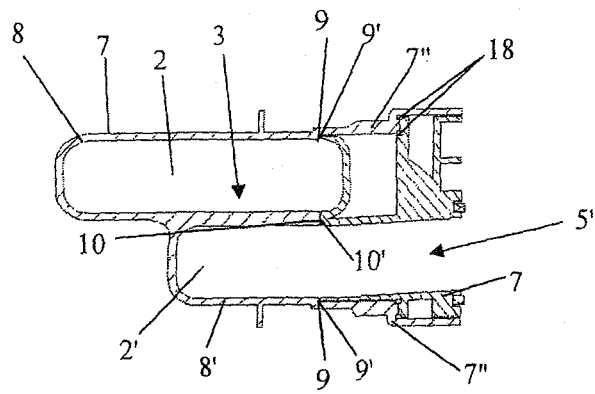
Figure 2D:
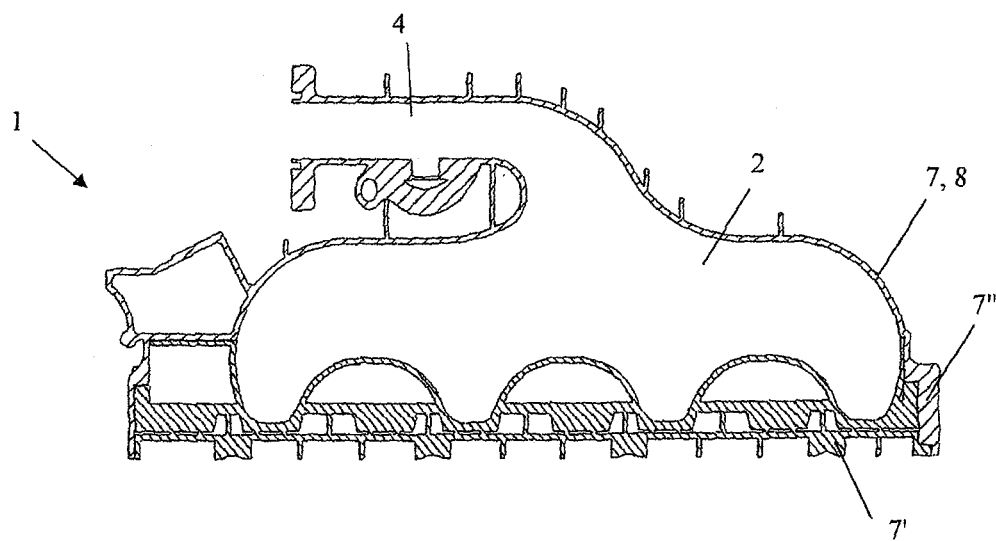
Figure 3:
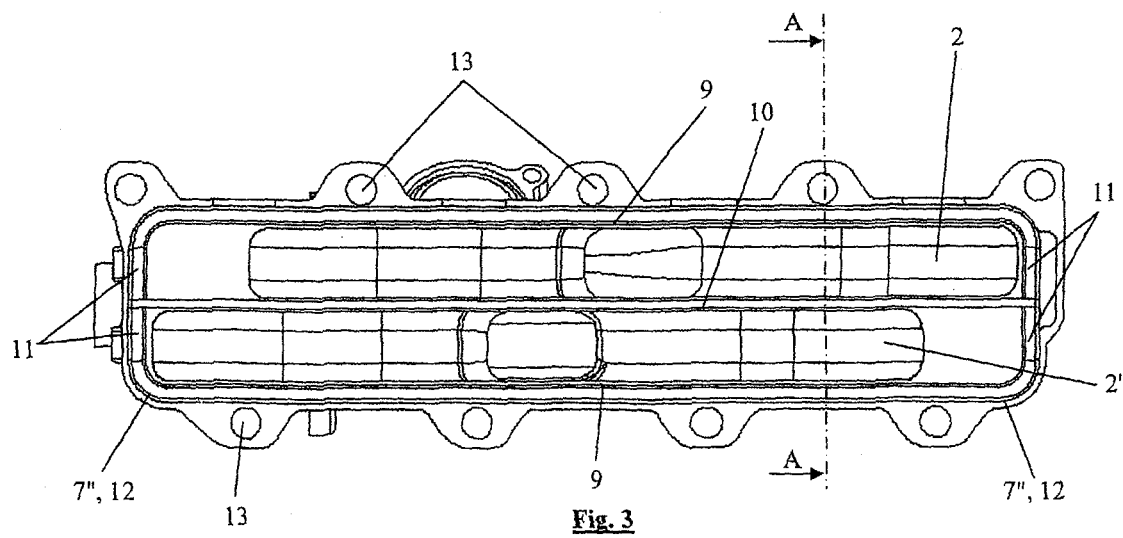
FIG. 3 is a view similar to that of FIG. 1, the second part having been removed (only the first part is shown)
Figure 4:
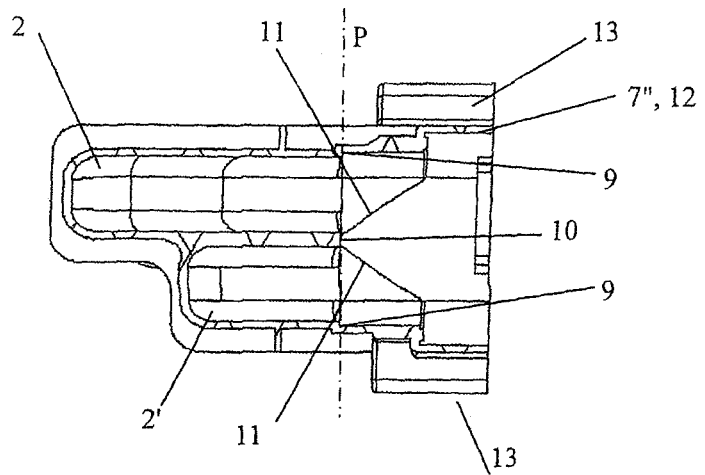
FIG. 4 is a cross-section along A-A of the object of FIG. 3.
Figure 5:
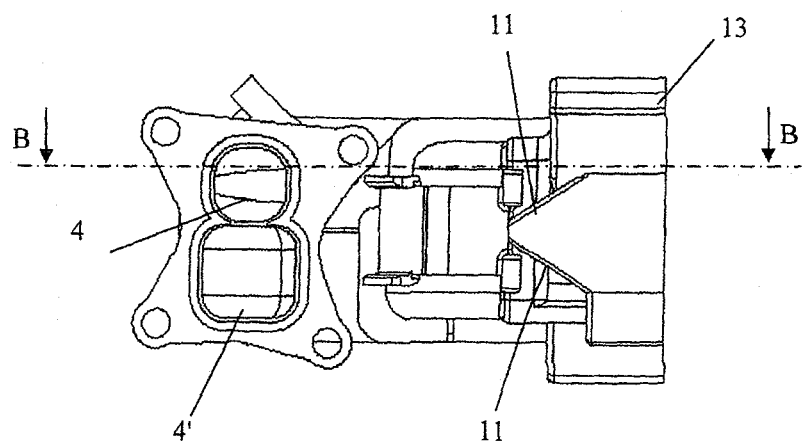
FIG. 5 is a left-hand side elevation of the object shown in FIG. 3.
Figure 6:
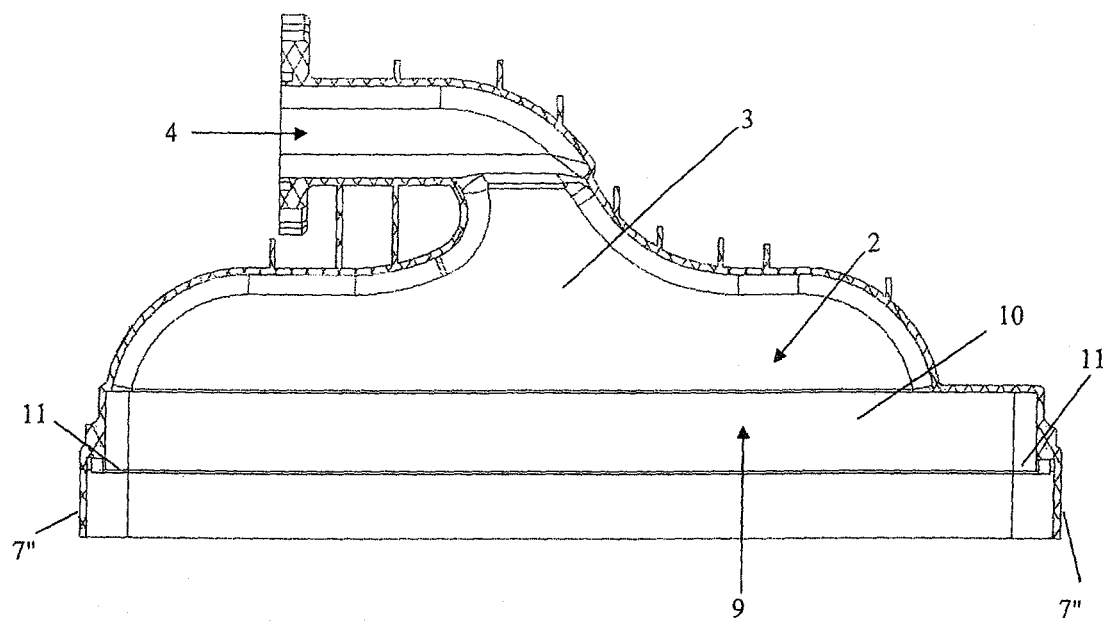
FIG. 6 is a cross-section along B-B of the object shown in FIG. 5.
Figure 7:
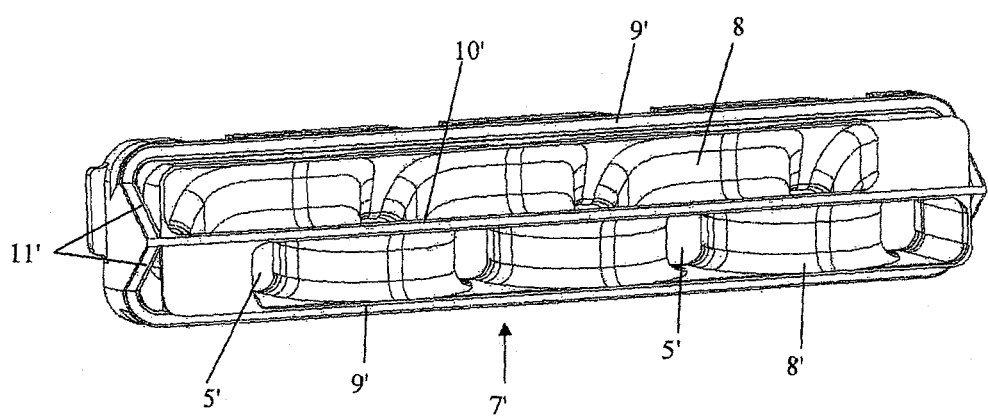
FIG. 7 is a perspective view of the second part of the manifold shown in FIGS. 1 and 2.
Figure 8:
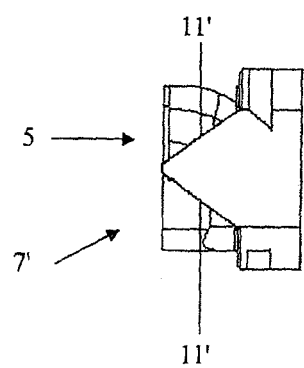
FIG. 8 is a side elevation of the second part shown in FIG. 7.

FIGS. 1, 2, 9, 10 and 11 show a double-plenum or double-chamber inlet manifold or splitter 1, made up of a structural unit comprising two distinct coupled plenums 2 and 2' with a common wall 3, a separate inlet opening 4 and 4' for each of the two plenums and several distinct pipes 5 and 5' through each of the said plenums. Superimposed plenums 2 and 2' have substantially flattened general structures and form, with their respectively connected inlet openings and pipes, two independent circulation circuits running from the entrance at the inlet openings 4 and 4' to the outlet at the external openings 6 and 6' of the pipes, the said external or outlet openings of the pipes being grouped in pairs, with each pair having an opening 6 and 6' of each of the two types of pipes 5 and 5'.

According to the invention, this manifold 1 comprises two one-piece parts 7 and 7' assembled together, in a gas-tight manner, at the continuous assembly areas, a first part 7 incorporating at least the two inlet openings 4 and 4' and first portions of the walls 3, 8, 8' of the two plenums 2 and 2', contiguous to the said openings 4 and 4' and the second part 7' incorporating the pipes 5 and 5' and second portions of the walls 3, 8, 8' of the two plenums 2 and 2', contiguous to the said pipes 5 and 5' and complementary to the above-mentioned first portions, the respective assembly interfaces 9, 10, 11, 9', 10', 11' of the two consecutive parts 7 and 7' being formed on mutually in-contact complementary edge configurations of the said two parts 7 and 7'.

Thanks to these different arrangements, the invention enables the above-mentioned main object to be achieved.

Advantageously, the first portions of wall constitute major portions and the second portions of wall constitute minor portions, each of the parts 7 and 7' consisting in a one-piece moulded part.

Preferably, the first part 7 also incorporates at least some external portions 12 of the plate or flange and/or some peripheral eyelets 13 for fixing the manifold 1, located around the outlet openings 6, 6' of the pipes 5, 5', the second part 7' thus forming a cassette type insert clicking into the first part 7.

According to an economically and productively practical embodiment, the two parts 7 and 7' each comprise a thermoplastic material, of the same type or compatible with each other, and they are assembled together by welding, for example by vibration- or infrared-welding.

As shown in FIGS. 2, 7, 9 and 11, the second part 7' basically incorporates wall portions 8, 8' of the plenums 2 and 2' by extending continually along or inside the pipes 5 and 5' and enclosing the said plenums 2 and 2' between these pipes 5 and 5' and a portion of the wall 3 common to both plenums 2 and 2'.

In order to create a structure that is simple, easy to manufacture and occupies little space (at least transversely), the wall 3 and the main parts of the walls 8 and 8' of the two coupled plenums are advantageously seen in cross-sections along a plane PC perpendicular to the main assembly areas, are substantially arranged in three parallel planes, conferring upon the said plenums general flat structures and internal volumes with substantially rectangular cross-sections, the first portions of the said walls 3, 8, 8', incorporated in the first component part 7, having, in section along the said plane PC, a configuration in the shape of a 3 or two Cs superimposed, the middle branch of the 3 or the common branches of the two Cs corresponding to the second component part 7', having, in section along the said plane PC, a complementary configuration of opposite assembly areas and providing second wall portions 3, 8, 8' enclosing the volumes of the plenums 2 and 2' and continuously connecting thereto the pipes 5 and 5'.

Preferably, the two component parts 7 and 7' each have three main assembly interfaces 9, 10; 9', 10' extending linearly or in a flat strip forming, in cross-section, the three free ends of the 3 shaped configuration provided by the first part 7 and the complementary configuration provided by the second part 7', these three parallel linear assembly interfaces 9, 10; 9', 10' being connected in pairs together, at the two component parts 7 and 7', in order to form continuous combined assembly interfaces at each plenum 2; 2', corresponding to the edges of the two portions of the common wall 3 and the external walls 8 and 8' incorporated into the first and second parts 7 and 7' respectively. This triple assembly simultaneously creates a seal at the two portions of each plenum 2 and 2' and ensures that the connection obtained between these two plenums is extremely strong and rigid.

In order to provide a wedged assembly of the second part 7' into the first 7 and ensure that this second part 7' is secured laterally therein, the edges forming the interfaces 9 of the portions of the walls 8 and 8' of the plenums 2 and 2' forming an integral part of the first component part 7 preferably extend to form a rectangular-section sleeve structure 7" in which is received, by adjusted and preferably sealed click-fitting, the second component part 7' forming an insert, the latter part incorporating, in addition to the walls of the pipes 5 and 5' and the second contiguous portions of the walls 3, 8, 8' of the plenums 2 and 2' ending in the interfaces 9' and 10', also portions of filling, connecting and stiffening structural walls 16, constituting the body of the fixing plate 12 of the said manifold 1.

In order to facilitate assembly (self-centering), achieve an additional mechanical connection with wedging between the two parts and guarantee a precise relative positioning between the latter, the sleeve structure 7" may have, on both of its opposite sides and substantially parallel to the plane PC, hollow formations 11, notably in the form of outward deformations of the wall of the said sides, cooperating by interconnection of form with complementary formations 11' in the form of portions of opposing side walls of the second part 7', their mutual click-fitting ensuring the alignment of the interfaces 9, 10; 9', 10' mutually opposite the two parts 7 and 7', these respectively complementary formations 11 and 11' preferably having contact surfaces that are flat or at right-angles in the form of linear segments, inclined at mutually opposing inclinations, so as to constitute wedge-shaped or triangular formations 11 and 11' projecting inwards and outwards respectively, the points of which are adjacent to the edges with the assembly interfaces 10 and 10' of the two component parts 7 and 7' at the wall 3 common to both plenums 2 and 2' (FIGS. 4, 5, 7 and 8).

According to a particular constructional characteristic of the invention, which also emerges from the accompanying drawings, all of the outlet openings 6 and 6' of the pipes 5 and 5' connected to the two plenums 2 and 2' are aligned on the same level, being arranged alternately and being grouped in pairs, and the second part 7' has a general parallelepiped shape, with a substantially rectangular external contour.

Furthermore, as shown in FIGS. 2B, 2C, 9, 11A and 11B, the main assembly interfaces 9, 10, 9', 10' of the two component parts 7 and 7' are in the form of strip surfaces located in the same plane P.

Compression seals 18, for example a pair of such seals, may be provided on the second part 7' that constitutes an insert, for example at a front side-offset area coming to rest against a complementary internal side-offset of the sleeve structure 7".

Figure 9:
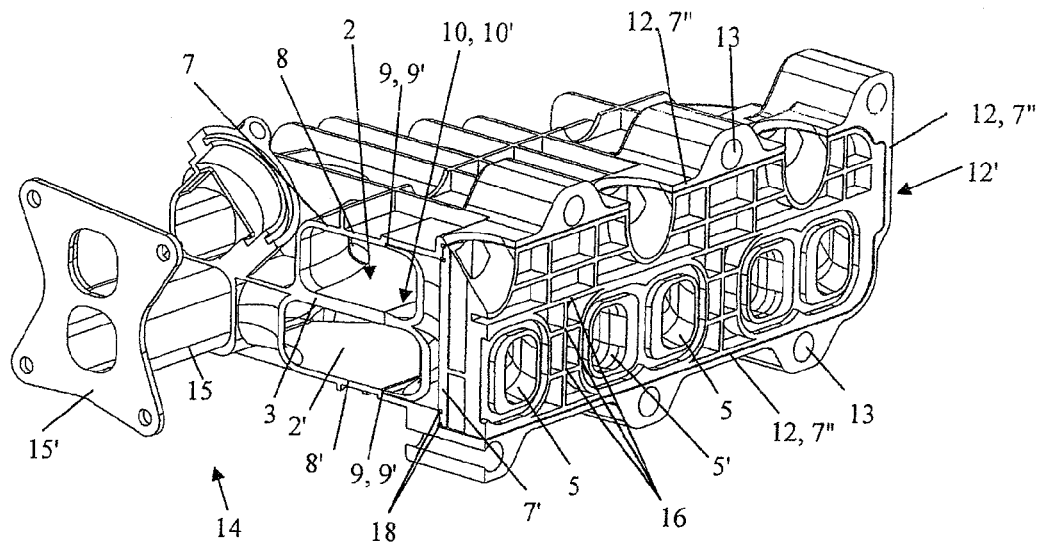
FIG. 9 is a cross-section along PC and in perspective of the manifold shown in FIG. 1.

According to a possible advantageous development of the invention, referring to FIG. 9 of the accompanying drawings, the inlet opening 4' of the plenum 2' designed to receive the recycled exhaust gases or EGR gas is provided with an inset thermal protection piece 15, preferably a one-piece element 14 made of a heat-resistant material, notably of a heat-hardenable material, the said piece 15 comprising one tubular part 15 fitted into the inlet opening 6' concerned and one part in the form of a plate 15' for its external fixing, the said plate 15' also forming a thermal decoupling element.

Such a piece 15 is notably described in the Applicant's French Patent Application No. 0755484.

Figure 10:
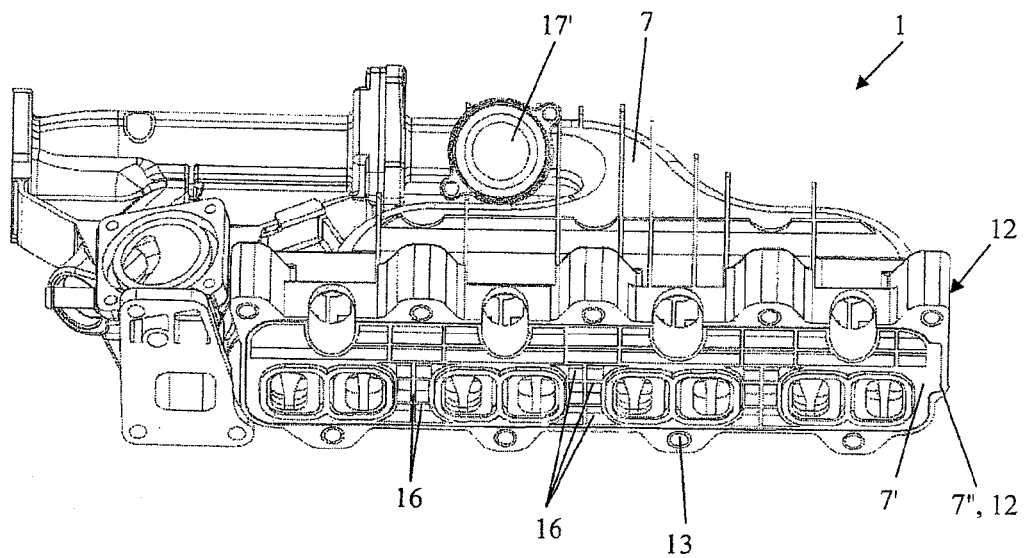
FIG. 10 is a perspective view of a variation of the manifold shown in FIG. 1, the EGR gas inlet being equipped with an adjustment device.
Figure 11A:
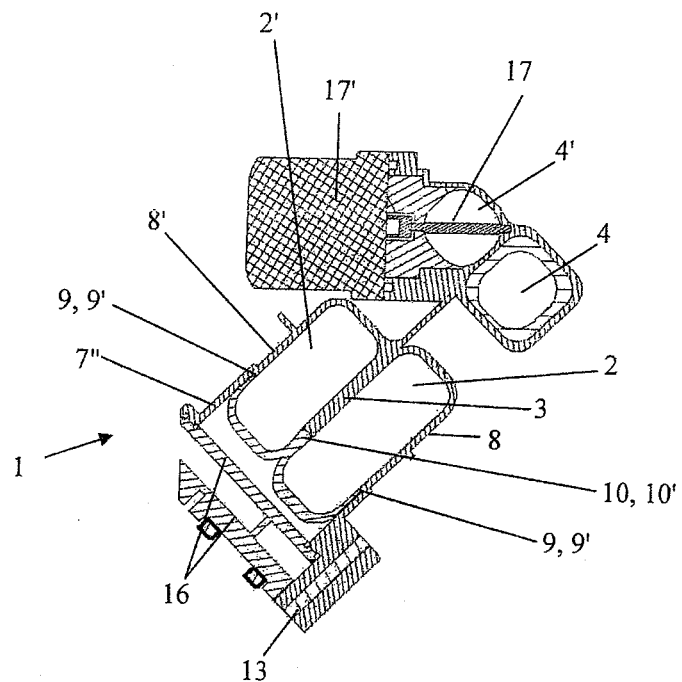
FIGS. 11A and 11B are cross-sections along A-A (parallel to PC) of the manifold shown in FIG. 10, the adjustment device being in the open and closed position respectively.
Figure 11B:
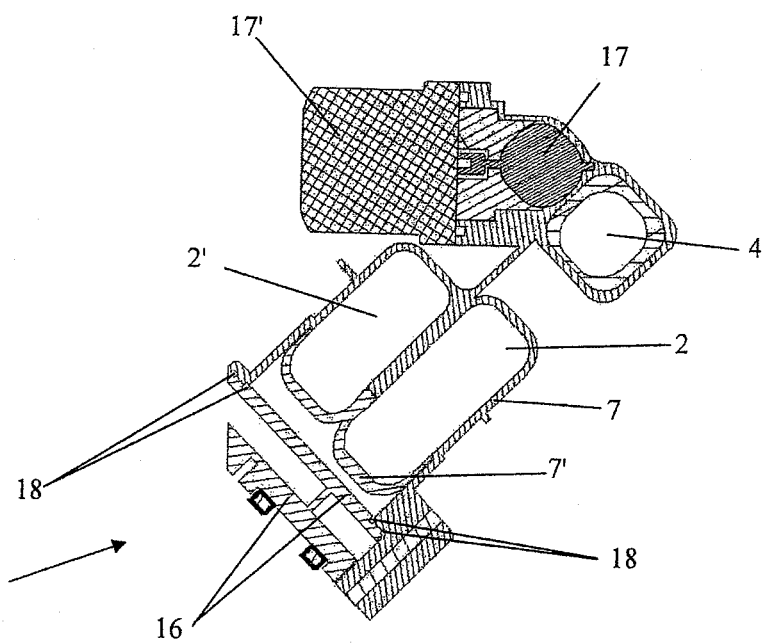

According to another possible advantageous development of the invention, shown in FIGS. 10 and 11 of the accompanying drawings, an adjustment device, for example a valve or throttle 17, connected to an actuator 17', is mounted over the inlet opening 4' of the plenum receiving the EGR gases, or over the end-piece leading to this opening 4', if necessary upstream of the thermal-protection piece 15.

The invention also concerns a motor-vehicle with an internal combustion engine, characterised in that it comprises an inlet manifold 1 as described above.

Clearly, the invention is not limited to the embodiments described and shown in the accompanying drawings. Modifications are possible, particularly from the point of view of the constitution of the various elements or by making equivalent technical substitutions, without departing from the scope of protection of the invention.

The invention claimed is:

1. A double-plenum or double-chamber inlet manifold or splitter, made up of a structural unit comprising two distinct coupled plenums with a common wall therebetween, an inlet opening for each of the two plenums and several pipes through each of the said plenums, the said superimposed plenums extending in a longitudinal direction of the manifold and having substantially flattened general structures and forming, with their respectively connected inlet openings and pipes, two independent circulation circuits running from the entrance at the inlet openings to the outlet at the external openings of the pipes, the the said external or outlet openings of the pipes being grouped in pairs, with each pair having an opening of each of the two types of pipes, the manifold comprising two one-piece parts assembled together, in a gas-tight manner, at continuous assembly areas, a first part including at least the two inlet openings and first portions of the said common wall and walls of the two plenums, contiguous to the said openings and the second part including the pipes and second portions of the said common wall and walls of the two plenums, contiguous to the said pipes and complementary to the first portions, the respective assembly interfaces of the two consecutive parts being formed on mutually in-contact complementary edge configurations of the said two parts, and in that the two parts each comprise a thermoplastic material, of the same type or compatible with each other, and in that they are assembled together by welding, for example by vibration- or infrared-welding.

2. The manifold according to claim 1, characterised in that the first portions of wall constitute major portions and the second portions of wall constitute minor portions, each of the parts consisting of a one-piece molded part.

3. The manifold according to claim 1, characterised in that the first part also incorporates at least some external portions of the plate or flange and/or some peripheral eyelets for fixing the manifold, located around the outlet openings of the pipes, the second part thus forming a cassette type insert clicking into the first part.

4. The manifold according to claim 1, characterised in that the second part incorporates wall portions of the plenums by extending continually along or inside the pipes and enclosing the said plenums between these pipes and a portion of the wall common to both plenums.

5. The manifold according to claim 4, characterised in that, seen in cross-section along a plane perpendicular to the main assembly areas, the common wall and the main parts of the walls of the two coupled plenums are substantially arranged in three parallel planes, conferring upon the said plenums general flat structures and internal volumes with substantially rectangular cross-sections, the first portions of the said common wall and walls, incorporated in the first component part, having, in section along the plane, a configuration in the shape of a 3 or two superimposed Cs, the middle branch of the 3 shaped configuration or the common branches of the two Cs corresponding to the second component part having, in section along the same plane, a complementary configuration of opposite assembly areas and providing second wall portions enclosing the volumes of the plenums and continuously connecting thereto the pipes.

6. The manifold according to claim 4, characterised in that the two component parts each have three main assembly interfaces extending linearly or in a flat strip forming, in cross-section, the three free ends of the 3 shaped configuration provided by the first part and the complementary configuration provided by the second part, these three parallel linear assembly interfaces being connected in pairs together, at the two component parts, in order to form continuous combined assembly interfaces at each plenum, corresponding to the edges of the two portions of the common wall and the external walls incorporated into the first and second parts respectively.

7. The manifold according to claim 6, characterised in that the edges forming the interfaces of the portions of the walls of the plenums forming an integral part of the first component part extend to form a rectangular-section sleeve structure in which is received, by adjusted and preferably sealed click-fitting, the second component part forming an insert, the latter part incorporating, in addition to the walls of the pipes and the second contiguous portions of the walls of the plenums ending in the interfaces, also portions of filling, connecting and stiffening structural walls, constituting the body of the fixing plate of the said manifold.

8. The manifold according to claim 7, characterised in that the sleeve structure has, on both of its opposite sides and substantially parallel to the plane, hollow formations, notably in the form of outward deformations of the wall of the said sides, cooperating by interconnection of form with complementary formations in the form of portions of opposing side walls of the second part, their mutual click-fitting ensuring the alignment of the interfaces mutually opposite the two parts, these respectively complementary formations preferably having contact surfaces that are flat or at right-angles in the form of linear segments, inclined at mutually opposing inclinations, so as to constitute wedge-shaped or triangular formations projecting inwards and outwards respectively, the points of which are adjacent to the edges with the assembly interfaces of the two component parts at the wall common to both plenums.

9. The manifold according to claim 1, characterised in that all of the outlet openings of the pipes connected to the two plenums are aligned on the same level, being arranged alternately and being grouped in pairs, and in that the second part has a general parallelepiped shape, with a substantially rectangular external contour.

10. The manifold according to claim 1, characterised in that the main assembly interfaces of the two component parts are in the form of strip surfaces located in the same plane.

11. The manifold according to claim 1, characterised in that the inlet opening of the plenum designed to receive the recycled exhaust gases or EGR gas is provided with an inset thermal protection piece, preferably a one-piece element made of a heat-resistant material, notably of a heat-hardenable material, the said piece comprising one tubular part fitted into the inlet opening concerned and one part in the form of a plate for its external fixing, the said plate also forming a thermal decoupling element.

12. The manifold according to claim 1, characterised in that an adjustment device, for example a valve or throttle, connected to an actuator, is mounted over the inlet opening of the plenum receiving the EGR gases, or over the end-piece leading to this opening, if necessary upstream of the thermal-protection piece.

13. A motor vehicle with an internal combustion engine, characterised in that it comprises an inlet manifold according to claim 1.

* * * * *